J. LEDIG.
STORAGE BATTERY SUPPORT.
APPLICATION FILED AUG. 11, 1915.
1,252,706.
Patented Jan. 8, 1918.
2 SHEETS—SHEET 1.
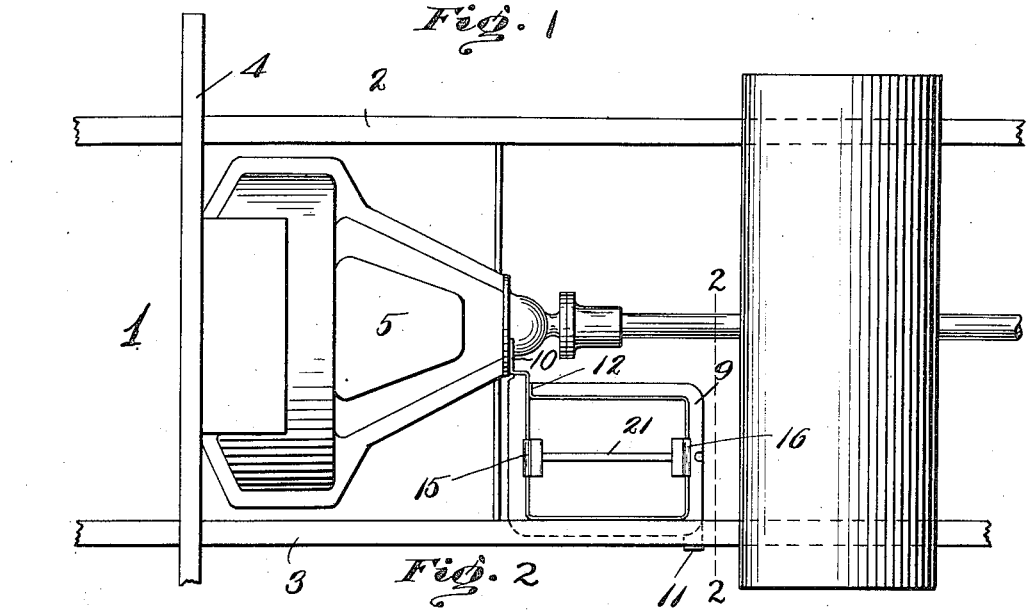
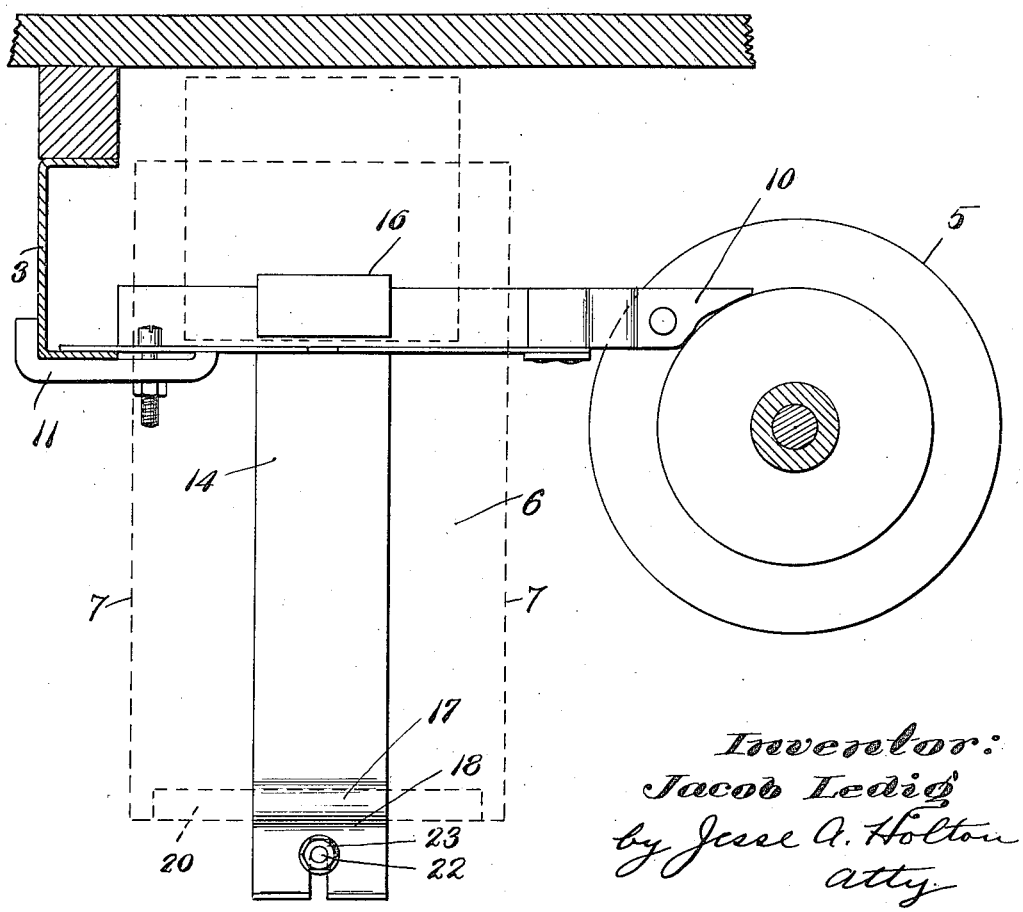
Inventor:
Jacob Ledig
by Jesse A. Holton
atty.

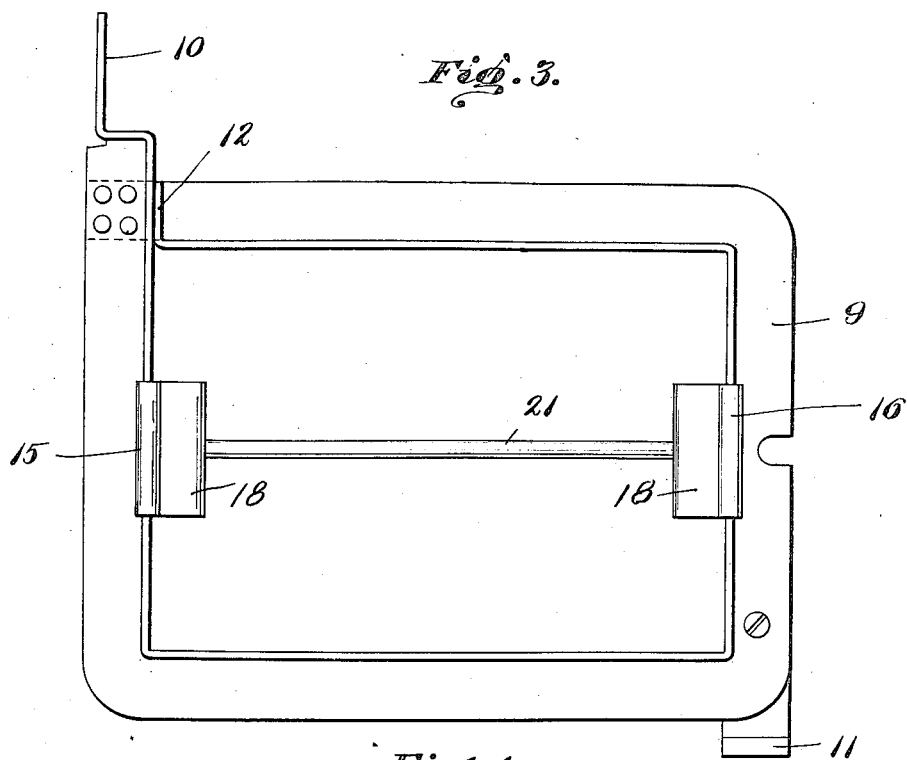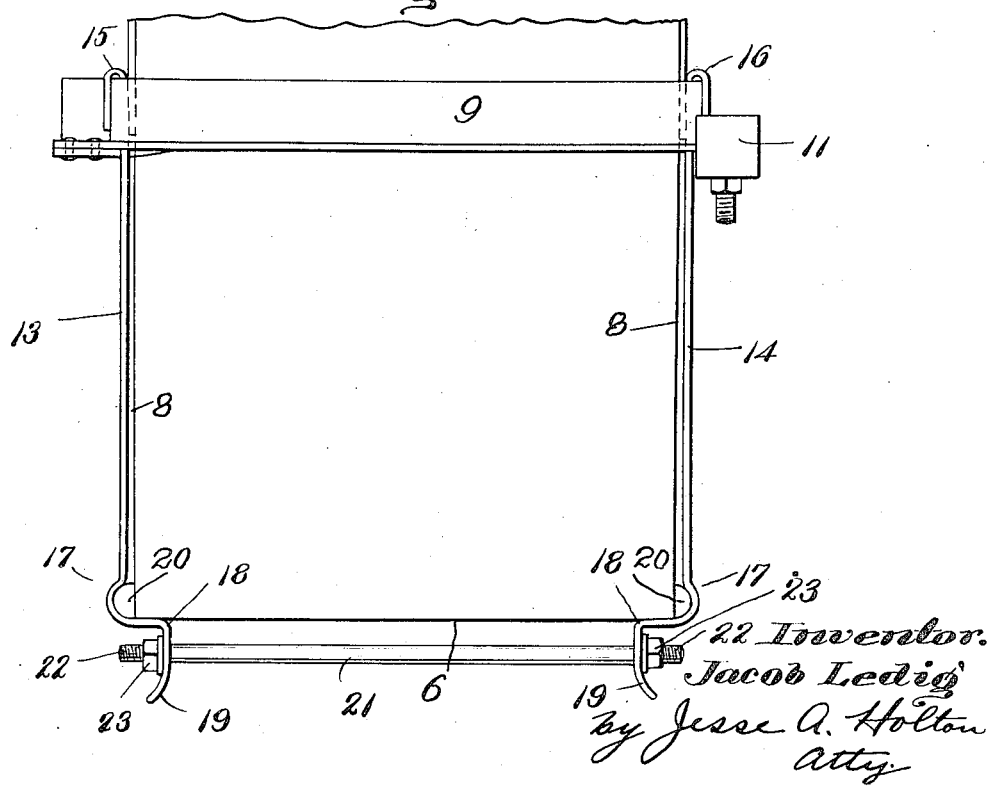

UNITED STATES PATENT OFFICE.

JACOB LEDIG, OF JAMAICA PLAIN, MASSACHUSETTS, ASSIGNOR TO GRAY & DAVIS INC., OF CAMBRIDGE, MASSACHUSETTS.

STORAGE-BATTERY SUPPORT.

1,252,706.

Specification of Letters Patent.     Patented Jan. 8, 1918.

Application filed August 11, 1915. Serial No. 44,993.

*To all whom it may concern:*

Be it known that I, JACOB LEDIG, citizen of the United States, and resident of Jamaica Plain, in the county of Suffolk and State of Massachusetts, have invented certain new and useful Improvements in Storage-Battery Supports, of which the following is a specification.

This invention relates to storage batteries and with respect to certain more specific features thereof to the means for supporting a storage battery and attaching same to an automobile.

It is one of the objects of the present invention to provide simple, efficient and inexpensive means for supporting a storage battery.

Another object is to provide means of the character specified which will facilitate the mounting of the battery upon an automobile and permit detachment of the same with ease and convenience when desired to adjust or repair parts.

Still another object of the invention is to locate the battery upon the car in such a manner that the former will be easily accessible, yet out of view, and free and clear of all working parts of the car. To this end the invention involves an improved method of attaching or associating the battery to or with the car.

Other features will be in part obvious and in part pointed out hereinafter.

The invention accordingly consists in various features of construction, combinations of elements, arrangements of parts, and the step or steps of the method, which will be exemplified by the construction hereinafter set forth and the scope of the application of which will be indicated in the following claims.

In the accompanying drawings wherein is shown one of various possible embodiments of the invention:

Figure 1 is a plan view of a portion of the chassis of an automobile, showing the invention, Fig. 2 is an enlarged section taken on the line 2—2 of Fig. 1, Fig. 3 is a plan view of the battery support and Fig. 4 is a view in elevation of the same showing the battery box in position.

Referring now more particularly to the drawings, there is indicated at 1 a portion of the chassis of an automobile comprising side channel irons 2 and 3. The dash of the car is shown at 4 and a housing 5 incases part of the power transmission devices between the engine and the driving axle of the car.

For various purposes well known in the art there is also associated with the car a storage battery 6, comprising longitudinal side walls 7, and oppositely disposed transverse side walls 8. As the storage battery is rectangular in plan, a rectangular frame piece 9 is constructed to receive the battery and to attach by means of an ear 10, and a clamp 11, respectively to the housing 5 and one of the side rails, as for instance, 3. The frame 9 is preferably an angle iron bent in rectangular form having its vertical wall bent outwardly at the abutting end as indicated at 12, and its horizontal wall slightly offset at this end to provide a suitable formation for a rivet joint.

As indicated in Fig. 2 the ear 10 attaches to a flange on the transmission housing 5 and upon the opposite side of the frame the horizontal wall of the angle iron rests upon the lower side of the channel iron 3. The clamp 11 secures the frame to the channel iron 3, although if desired the frame may be connected thereto at other points by rivets, screws, bolts, or other suitable fasteners. Spring metal straps 13 and 14 are suspended from the frame by means of hooks 15 and 16 which respectively engage with oppositely disposed vertical walls of the frame angle iron 9. These hooks tend to hold the straps in substantially vertical position.

Each strap is provided near its lower end with an outward offset 17, an inward offset 18, and the extreme ends of the straps are curved or directed outwardly as at 19. Upon corresponding oppositely disposed side walls of the battery 6, there are provided projections or beads 20 adapted to engage with the offset 17 and hold the battery against upward movement. The inward projections 18 of the straps are adapted to take in under the base of the battery and support the same. A tie bolt 21, is adapted to connect the two straps and is provided with threaded ends 22 and 23 whereby the straps may be secured in position when the battery has been introduced.

Assuming now that the frame structure comprising the angle iron 9, the attaching portions 10 and 11, the straps 13 and 14 and the tie bolt 20 is supported as previously stated between the transmission housing and the side beam of the chassis. To introduce the battery the operator takes off the tie bolt and moves the battery in an upward direction wedging it between the leading portions 19 of the straps 13 and 14 thereby causing the straps to yield in an outward direction. The operator then continues to move the battery upwardly until the inwardly turned portions of the strap spring in under the base of the battery. The battery is then supported by the frame and the operator is free to use both hands to introduce the tie bolt 21 and adjust the nuts 23 thereon to bring the side walls of the straps securely against the battery with the offset portions 17 bearing against the beads 20.

It will be obvious from the foregoing that the battery may be removed at any time by contra-wise action and that the battery is located in a convenient and easily accessible place and entirely obscured from view.

As many changes could be made in the above construction and steps of the method, and as many apparently widely different embodiments of this invention could be made without departing from the scope thereof it is intended that all matter contained in the foregoing description or shown in the accompanying drawings, shall be interpreted as illustrative and not in a limiting sense.

Having described the invention, what I desire to secure by Letters Patent is:

1. A battery support comprising in combination means adapted to hold the battery against transverse movement and means adapted to yield laterally to permit entry of the battery from below said first means and adapted to hold the battery against downward movement.

2. A battery support comprising in combination means adapted to hold the battery against transverse movement and means including a spring clip permitting entry of the battery from below said first means and adapted to hold the battery against downward movement.

3. In a device of the nature described, in combination, a frame adapted to surround the side walls of a battery, means coöperatively arranged with said frame whereby the same may be attached to a side rail and to a part of the transmission housing of an automobile, means attached to said frame adapted to yield to permit the introduction of the battery from below said frame, and means adapted to secure said battery against downward movement.

4. In a device of the nature described, in combination, a rectangular frame adapted to surround the vertical side walls of a battery, attaching members for securing the frame to the frame of an automobile and a part relatively stationary therewith, vertical straps depending from said rectangular frame one of which is adapted to be sprung out of the path of the battery when the same is introduced from below and movable to take in toward the battery when the latter is moved into position, and means adapted to secure said straps in battery holding position.

5. In a device of the nature described, in combination, a support for a battery adapted to hold the same against sidewise movement in any direction and permit the introduction and withdrawal of same from below, a storage battery, means on the battery and means on said support adapted to engage to attach the battery with and to the support, so as to hold said battery against vertical movement in either direction, and means for quick detachably hanging the support upon an automobile.

6. In a device of the nature described, in combination, a horizontally disposed rectangular frame adapted to surround the upper side walls of a battery, a strap depending from each of opposite sides of said frame, one of said straps having an offset outwardly to receive a projection on the battery and an offset inwardly to take in under the battery and means below the plane of the base of the battery adapted to connect the two straps.

7. In a device of the nature described in combination, a horizontally disposed rectangular frame adapted to surround the upper side walls of a battery, a strap depending from each of opposite sides of said frame, one of said straps having an offset outwardly to receive a projection on the battery and an offset inwardly to take in under the battery, and means comprising a tie rod below the plane of the bottom of the battery adapted to connect the two straps.

8. In apparatus of the character described, in combination, a transmission part housing, a side rail, a rectangular frame having means whereby it may be attached to said housing and said rail, a floor above said frame, means depending from said frame adapted to receive a battery introduced upwardly, and means coöperatively arranged with said last means to secure the battery in position.

9. A vehicle provided with a battery holder comprising means inclosing and engaging the battery to support the latter and hold it against displacement relatively thereto in any direction, said means being adjustable to provide for the insertion and removal of the battery from below.

10. A battery holding attachment for automobiles comprising means for attachment to the automobile in a position below the body thereof and means for inclosing and engaging a battery to support the latter and hold it against displacement relatively thereto in any direction, said battery inclosing means including relatively adjustable parts which provide for the insertion and removal of the battery from below.

11. A battery holding attachment for automobiles comprising means for attachment to the automobile in a position below the body thereof; means for inclosing and engaging a battery to support the latter and hold it against displacement relatively thereto in any direction, said battery inclosing means including parts that are relatively adjustable to provide for the insertion and removal of the battery from below, and means for locking said parts against accidental displacement.

Signed at Cambridge, in the county of Middlesex and State of Massachusetts, this 2nd day of August, A. D. 1915.

JACOB LEDIG.